United States Patent
Hamed et al.

(10) Patent No.: US 9,650,742 B2
(45) Date of Patent: May 16, 2017

(54) PROCESS FOR MAKING HYDROGELS FROM HEMICAUSTIC BYPRODUCT

(71) Applicant: Rayonier Performance Fibers, LLC, Jacksonville, FL (US)

(72) Inventors: Othman A. Hamed, Jesup, GA (US); Romuald S. Krzywanski, Richmond Hill, GA (US)

(73) Assignee: Rayonier Performance Fibers, LLC, Jacksonville, FL (US)

( * ) Notice: Subject to any disclaimer, the term of this patent is extended or adjusted under 35 U.S.C. 154(b) by 107 days.

(21) Appl. No.: 14/566,986

(22) Filed: Dec. 11, 2014

(65) Prior Publication Data

US 2016/0168796 A1  Jun. 16, 2016

(51) Int. Cl.
| | |
|---|---|
| *D21C 9/08* | (2006.01) |
| *C08B 37/00* | (2006.01) |
| *D21H 17/00* | (2006.01) |
| *D21H 17/64* | (2006.01) |
| *C08L 5/14* | (2006.01) |
| *D21C 9/00* | (2006.01) |

(52) U.S. Cl.
CPC .......... *D21C 9/083* (2013.01); *C08B 37/0057* (2013.01); *C08L 5/14* (2013.01); *D21C 9/08* (2013.01); *D21H 17/64* (2013.01); *D21H 17/74* (2013.01); *D21C 9/002* (2013.01); *D21C 9/004* (2013.01)

(58) Field of Classification Search
CPC .......... D21C 9/002; D21C 9/004; D21C 9/08; D21C 9/083; C08B 37/14
See application file for complete search history.

(56) References Cited

U.S. PATENT DOCUMENTS 3,833,527 A * 9/1974 Pulkkinen et al. ... C02F 1/5263
                                                          210/730

OTHER PUBLICATIONS

Rydholm, Pulping Processes, 1965, Interscience Publishers, p. 992-1023.*
Du et al.,Tough and multi-responsive hydrogel based on the hemicellulosefrom the spent liquor of viscose process, 2016, International Journal of Biological Macromolecules, 88, p. 451-456.*
Lindblad et al., New Hemicellulose-Based Hydrogels, Oct. 2003, acs.org, chapter 22 of Hemicelluloses:science and Technology, p. 348-359.*
Vendittie et al., The Production and Characterization of Inexpensive Renewable Hydrogel Based Material from Natural North Carolina Resources for Water Desalination and Heavy Metal Removal Applications,Aug. 2013, University of North Carolina,.*

* cited by examiner

*Primary Examiner* — Anthony Calandra
(74) *Attorney, Agent, or Firm* — Lucas & Mercanti, LLP; William Spatz

(57) ABSTRACT

A process for making a hydrogel forming material from a kraft or sulfite pulping process cellulosic pulp slurry by extracting hemicellulose heteropolymers from the cellulosic pulp slurry as a hemicaustic extract by treating the cellulosic pulp slurry with a cold caustic solution, then isolating the hemicaustic extract and preparing a mixture of the hemicellulose extract and a derivatizing agent comprised of a monofunctional etherifying agent and/or a polyfunctional organic cross-linking agent, and reacting the mixture to produce the hydrogel forming material. A polyvalent metal cross-linking agent can optionally be reacted with the hydrogel forming material to enhance its gel strength.

6 Claims, 3 Drawing Sheets

Hardwood xylan

R = CH₃CO or H

Hardwood glucomannan softwood xylan

Softwood glucomannan

PROCESS FOR MAKING HYDROGELS FROM HEMICAUSTIC BYPRODUCT

FIELD OF THE INVENTION

This invention relates to cellulose based gels and a method of making hydrogel forming materials from the hemicaustic byproduct of pulp manufacturing.

BACKGROUND OF THE INVENTION

The manufacture of certain cellulose pulp products involves subjecting pulps to extraction with a caustic solution, formed from alkali metal salt, such as sodium hydroxide or potassium hydroxide, or other basic compounds such as ammonium hydroxide. This extraction process is preferably conducted at temperatures in the range of about 15° C. to 40° C. and is commonly referred to in the art as cold caustic extraction. It is usually performed by mixing a low consistency cellulose pulp slurry with an alkaline solution and allowing the mixture to soak until the hemicelluloses in the pulp are dissolved and diffuse out of the pulp fibers. The extracted cellulose pulp fiber is then washed to remove the alkaline/caustic solution and the dissolved hemicelluloses. The effluent stream produced by this extraction and washing, referred to herein as a hemicaustic extract, can be further processed by passing it through filtration membranes to increase its hemicellulose concentration. The presence of hemicelluloses in hemicaustic extract makes the cold caustic effluent a possible source of hemicelluloses. The caustic extraction process is described in U.S. Pat. Nos. 6,896,810, 7,812,153 and 7,919,667, all of which are hereby incorporated by reference.

Like cellulose, hemicellulose is a polysaccharide found in wood and other plant materials. It differs from cellulose in many ways. Cellulose is normally fibrous and partially crystalline. Hemicelluloses are non-fibrous and amorphous. Structurally, cellulose is a long chain polymer of anhydroglucose monomer units with a number average degree of polymerization (DP) from 3,000 to 5,000. Hemicelluloses are relatively short chain polymers of predominately mannose and xylose monomers. Cellulose is a homopolysacharide while hemicelluloses are heteropolyhydroxylated polymers. The sugar moiety of both cellulose and hemicelluloses chains bear free hydroxyl groups that are available for chemical reaction. They are capable of undergoing reactions which are typical for primary and secondary alcohols. Heterosacharides can be derivatized to produce materials that can be used as thickeners for foods, coatings, paints, explosive slurries, oil well fluids, cosmetics and other personal care products, and many other products.

Ether derivatives of polyhydroxyl polymers are obtained by chemical reaction of the hydroxyl groups of the monosaccharide moiety with alkylene oxides (ethylene, propylene, butylene or higher oxides) or alkyl chlorides, in the presence of an alkaline catalyst (such as sodium hydroxide). These derivatization reactions may be conducted under heterogeneous conditions in the substantial absence of water or solvent, although the efficiency of the reaction is low without the presence of water. Accordingly, polyhydroxyl polymers are generally derivatized in the presence of a small amount water to provide better reactivity. For instance, carboxymethyl hydroxyalkyl derivatives of polyhydroxyl celluloses can be obtained by chemical reaction of the hydroxyl groups of hemicellulose chains with a mixture of alkylene oxides (ethylene, propylene, butylene or higher oxides) and chloroacetic acid or a salt thereof, such as sodium chloroacetate, in the presence of water and an alkaline catalyst.

Utilization of hemicaustic effluents has been the subject of considerable research. For example, U.S. Pat. No. 7,812,153 describes a process for extracting hemicelluloses from a hemicaustic stream and the use of the hemicaustic so obtained in the manufacture of xylose, which is then hydrogenated to xylitol. U.S. Pat. No. 3,988,198 discloses a method of treating spent hemicaustic effluents so that they can be used for cooking, bleaching or the caustic extraction of pulps. The methods previously investigated included both physical and chemical procedures, but none adequately provide an economical and efficient process for converting cellulose pulp industry byproduct hemicelluloses, and other carbohydrates present in hemicaustic, into useful products.

SUMMARY AND OBJECTS OF THE INVENTION

The present invention provides a method to produce a value added material with commercial applications from a pulp and paper industry byproduct, hemicellulose. One object of the present invention is to provide a process for converting a hemicaustic extract from the cold caustic extraction of cellulosic pulp into a material that forms a gel with high viscosity in an aqueous solution. It is a further object of this invention to provide a hydrogel forming material which can be used as a thickener in paints and lubricants in oil and gas well drilling, mining, construction, and many other applications. It is further in object of this invention to convert the pulp and paper industry hemicaustic extract into a gelling material capable of producing nearly clear solutions upon dispersing in water.

The process of the invention comprises:

Extracting hemicellulose from a cellulosic pulp slurry as a hemicaustic extract by treating the cellulosic pulp slurry with a cold caustic solution;

Isolating the hemicaustic extract from the treated cellulosic pulp slurry;

Optionally removing a portion of the water from the hemicaustic extract;

Preparing a heterogeneous mixture comprised of the hemicellulose extract and derivatizing agent(s) comprised of monofunctional etherifying agent(s) and/or polyfunctional organic cross-linking agent(s);

Inducing a derivatization reaction of hemicellulose in the hemicaustic extract by raising the temperature of the mixture and thereby producing a hydrogel forming material;

Optionally neutralizing the gelling material so produced to a pH ranging from 3 to 12;

Optionally drying the hydrogel forming material to a water content of a water content between 20% and 90% by weight; and Optionally adding a polyvalent metal cross-linking to the hydrogel forming material to enhance its gel strength.

DETAILED DESCRIPTION OF THE INVENTION

Figure 1A:
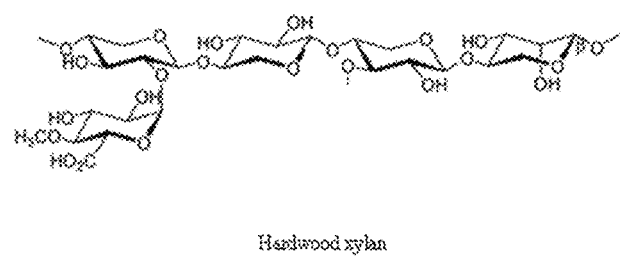
FIG. 1A Typical structure of xylan hemicelluloses from hardwood.
Figure 1B:
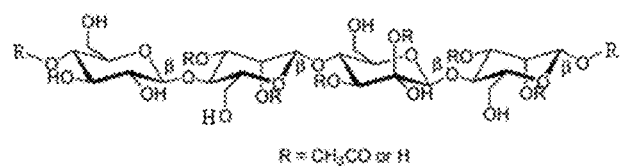
FIG. 1B Typical structure of glucomannan hemicelluloses from hardwood.
Figure 2A:
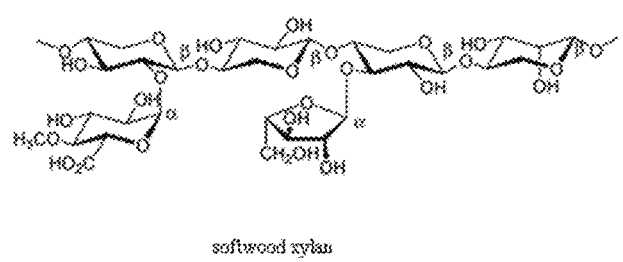
FIG. 2A Typical structures of xylan hemicelluloses from softwood.
Figure 2B:
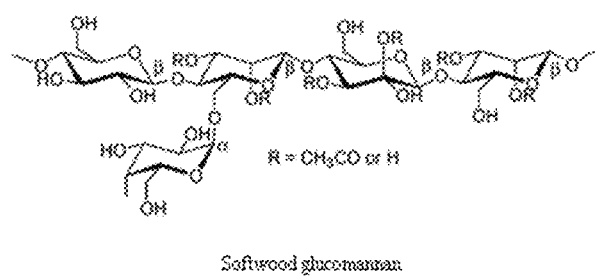
FIG. 2B Typical structures of glucomannan hemicelluloses from softwood.

The cellulose pulp industry byproduct hemicaustic extract stream of the present invention is aqueous mixture of extracted hemicelluloses, cellulose fragments, alkali metals, and alkali hydroxide. The hemicaustic extract utilized in the invention can be derived from any wood, including softwoods and hardwoods, and also from non-wood materials, such as bamboo, bagasse and annual crops such as straw, stalks, husk, hulls and bran. Suitable cellulosic pulps for use in the invention can be pre-processed by either of the well-known kraft or sulfite processes. Hard wood pulps derived from a kraft process are preferred. There are five main classes of hemicelluloses in such hemicaustic extract—galactoglucomannan, arabinoglucuronoxylan, arabinogalactan, glucuronoxylan, and glucomannan. The main hemicelluloses of softwood are galactoglucomannan, glucomannan and arabinoglucuronoxylan (Fengel and Wegener 1989, Sjöström 1993, Shimizu 2001). There are significant differences between softwoods and hardwoods. Hardwood species have about 75-95% of their hemicellulose in xylan form, more specifically an o-acetyl-4-Omethylglucurono-β-D-xylan (Sjostrom, E., Wood Chemistry. Fundamentals and Applications. Second edition ed. 1993, San Diego: Academic press. 292). The principal hemicelluloses of softwoods are glucomannans. Unlike glucomannan, xylan contains acidic groups (glucuronic acid) and has a molecular structure similar to cellulose when their branches are removed from xylan (Mitikka, M., Teeaar, R., Tenkanene, M., Laine, J., Vuorinene, T., Sorption of xylans on cellulose fibers, in 8th International Symposium on Wood and Pulping Chemistry. 1995: Helsinki, Finland. p. 231-236). Hemicelluloses have an average degree of polymerization (DP) between 50 and 200.

Typical chemical structures of some of the hemicelluloses contained in the hemicellulose extract of the invention are shown in FIGS. 1A and 1B and 2A and 2B. Hemicelluloses are linear heteropolymers generally composed of cyclic 5-carbon and 6-carbon sugars (polysaccharides) namely xylose, arabinose, galactose, glucose, mannose, and 4-O-methyl-D-glucuronic acid residues.

The cellulose pulp hemicaustic extract of the invention contains hemicelluloses from about 2% to 12% by weight, from about 2% to 8% by weight of caustic compounds (sometimes referred to herein as simply caustic), lignin less than 1% by weight, and other organic and inorganic components with less than 1% by weight. Preferably the hemicaustic extract is concentrated by nanofiltration or evaporation. The term "nanofiltration" refers to a process that uses filtration membranes having a smaller pore size than those typically used in ultrafiltration processes. Preferably after concentration, the hemicaustic extract contains from about 5 wt % to about 15 wt % hemicelluloses and from about 3 wt % to about 20 wt % of caustic. More preferably the concentrated hemicaustic extract contains from about 3 wt % to about 8 wt % of caustic compounds. The hemicelluloses in the hemicellulose extract of the present invention comprise the sugar monomers glucose, xylose, mannose, and arabinose, with xylose monomer being the principal sugar monomer. Preferably, xylose is more than 30% by weight of the hemicellulose heteropolymer sugars in the hemicellulose extract of the present invention, more preferably is 50% to 95% by weight thereof, and most preferably from 70% to 99% by weight thereof.

According to the process of the present invention, the hemicaustic extract is derivatized as more fully explained hereafter. Preferably the hemicaustic extract, whether concentrated as described above or not, is subjected to evaporation to reduce its water contents to about 50% to 60% by weight. This evaporation step can be performed under reduced pressure. At water concentrations of less than about 50% by weight derivatization of the hemicellulose extract can result in the formation of a reaction product which is a solid mass, which cannot easily be handled. Accordingly, it is preferred that the hemicaustic extract of the invention be derivatized at a moisture content above about 50% by weight.

According to the present invention the hemicelluloses in hemicaustic extract are preferably derivatized with reagents that are polar and carry at least one functional group that undergoes ionization in aqueous alkaline solution. More preferably the derivatizing reagents of the invention can undergo a bimolecular substitution reaction ($S_N2$), and most preferably derivatizing agent undergoes an etherification reaction. Monofunctional etherifying agents are preferred. Suitable derivatizing agents that are monofunctional etherifying agents include, but are not limited to, compounds that contain reactive halogen such as alkyl halides, halocarboxylic acid, halofatty acids, haloalkylsulphonic acids, haloalkylammonium compounds, and halohydins, and salts of thereof. Examples of such reagents are halomethane, haloethane, α-haloacetic acid and its salt, chloropropanols, chloro-2-hydroxypropyltrimethylammoniumhydrochloride, and diethylaminoethylchloride. The monofunctional derivatizing agents can also be compounds containing a reactive unsaturated bond (e.g., ethylene sulphonic acid, acrylonitrile, and acrylamide), alkylsulphates, sultones, diazomethane, ethylene imine, methylolurea, and methylolmelamines.

The preferred monofunctional derivatizing agents are those containing a reactive epoxy group. They include alkylene oxide, epoxychlorohdrin, and epoxy carboxylic acid. Examples of compounds with active epoxy groups are ethylene oxide, propylene oxide, epichlorohydrin, and mixtures thereof. The most preferred monofunctional derivatizing agents are propylene oxide, ethylene oxide, chloromethane, and chloroacetic acid or the salts thereof, and mixtures of the foregoing.

Polyfunctional organic cross-linking agents are also suitable derivatizing agents in the invention, and can be used alone or in conjunction with monofunctional derivatizing agents. They include polyepoxides, including ethylene glycol diglycidyl ether, glycerol triglycidyl ether, glycerol diglycidyl ether, glycerol propoxylate triglycidyl ether, polyethylene glycol diglycidyl ether, propylene glycol glycidyl ether, 1,4-cyclohexanoldimethanol diglycidyl ether, diglycidyl 1,2-cyclohexanedicrboxylate, N,N-diglycidyl aniline, N,N-diglcidyl-4-glycidyloxyaniline, and diglycidyl 1,2,3,4-tetrahydrophthalate; and polyfunctional epoxy silanes, including glycidoxymethyltrimethoxysilane, glycidoxymethyl triethoxysilane, 2-glycidoxyethyl trimethoxysilane, 2-glycidoxyethyltriethoxysilane, 1-glycidoxyethyl trimethoxysilane, 1-glycidoxyethyl triethoxysilane, 3-glycidoxypropyltrimethoxysilane, 3-glycidoxypropyl triethoxysilane, 2-glycidoxypropyl trimethoxysilane, 2-glycidoxypropyltriethoxysilane, 1-glycidoxypropyl trimethoxysilane, 1-glycidoxypropyl triethoxysilane, 4-glycidoxybutyltrimethoxysilane, 4-glycidoxybutyl triethoxysilane, 3-glycidoxybutyl trimethoxysilane, 2-glycidoxybutyltrimethoxysilane, 2-glycidoxybutyl triethoxysilane, 1-glycidoxybutyl trimethoxysilane, 1-glycidoxybutyl triethoxysilane, (3,4-epoxycyclohexyl)methyltrimethoxysilane, (3,4-epoxycyclohexyl) methyl triethoxysilane, glycidoxymethylmethyl dimethoxysilane, glycidoxymethylmethyl diethoxysilane, 2-glycidoxyethylmethyl dimethoxysilane, 2-glycidoxyethylmethyl diethoxysilane, 1-glycidoxyethylmethyl dimethoxysilane, 1-glycidoxyethylmethyl diethoxysilane, 3-glycidoxypropylmethyl dimethoxysilane, 3-glycidoxypropylmethyl diethoxysilane, 2-glycidoxypropylmethyl dimethoxysilane, 2-glycidoxypropylmethyl diethoxysilane, 1-glycidoxypropylmethyl dimethoxysilane, 1-glycidoxypropylmethyl diethoxysilane, 4-glycidoxybutylmethyl dimethoxysilane, 4-glycidoxybutylmethyldiethoxysilane, 3-glycidoxybutylmethyl dimethoxysilane, 3-glycidoxybutylmethyl diethoxysilane, 2-glycidoxybutylmethyl dimethoxysilane, 2-glycidoxybutylmethyldiethoxysilane, 1-glycidoxybutylmethyl dimethoxysilane, 1-glycidoxybutylmethyl diethoxysilane, (3,4-epoxycyclohexyl)methylmethyl dimethoxysilane, and (3,4-epoxycyclohexyl)methylmethyldiethoxysilane.

Preferably the organic cross-linking agent is added to the derivatization reaction mixture in amounts from about 0.1% to about 100% by weight of the monofunctional etherifying agent(s). Preferably the organic cross-linking agent is not more than about 10% and more preferably not more than about 5% of the weight of monofunctional etherifying agent(s). Expressed as a weight ratio, the preferred amount of monofunctional etherifying agent to the polyfunctional organic cross-linking agent is in the range from about 1:1 to 99:1. The preferred polyfunctional organic cross-linking agents are ethylene glycol diglycidyl ether, glycerol triglycidyl ether and glycerol diglycidyl ether, and mixtures thereof.

Another class of derivatizing agent which is useful in the invention are polyvalent metal complexes. These agents are capable of bonding to functional groups present on hemicelluloses chains in the hemicellulose extract, such as hydroxyl groups, alkoxy groups, carbonyl groups, aromatic, and carboxylate groups. Examples of polyvalent metal complexes suitable for use as in the present invention are titanium(IV) oxysulfate, titanium (IV) tetrachloride, titanium sulfate, tetrakis(isopropoxy)-titanium, aluminum sulfate, zirconium oxychloride, zirconium orthosulfate, zirconium acetate, zirconium tetrachloride, zirconium carbonate, zirconium ammonium carbonate, titanium dioxide, zirconium acetylacetonate, titanium citrate, titanium malate, titanium tartrate, zirconium lactate, and aluminum acetate, sodium borate, sodium tetraborate, disodium tetraborate, potassium borate, potassium tetraborate, and mixtures thereof. The polyvalent metal complexes can be used in solid form or in solution form. Preferably the polyvalent metal complexes are used in a solution from having polyvalent metal concentration ranging from about 0.1% by weight to 30% by weight, more preferably 0.5% to 15% by weight, and most preferably form 1.0% to 10% by weight.

One preferred embodiment of the process of the invention is:

Extracting hemicellulose heteropolymers from a cellulosic pulp slurry as a hemicaustic extract by treating the cellulosic pulp slurry with a cold caustic solution;

Isolating a hemicaustic extract from the treated cellulosic pulp slurry;

Optionally removing a portion of the water from the hemicaustic extract by nanofiltration or evaporation;

Preparing a heterogeneous mixture comprised of the hemicellulose extract and derivatizing agent(s) comprised of monofunctional etherifying agent(s) and/or polyfunctional organic cross-linking agent(s);

Inducing a derivatization reaction of hemicelluloses in the hemicaustic extract under an inert atmosphere by raising the temperature of the mixture 50° C. to the boiling point of the solution under reflux conditions and thereby producing a gelling material;

Optionally neutralizing the gelling material so produced to a pH ranging from 3 to 12;

Optionally drying the gelling material to a water content of a water content between 20% and 50% by weight; and Optionally adding a polyvalent metal cross-linking to the gelling material to enhance its gel strength.

The gelling material of the present invention can be prepared by various methods. In one method, an excess amount of the derivatizing agent is added gradually to hemicaustic extract. In another preferred embodiment, the derivatizing agent is added in one dose. After agitation for about 3 minutes, preferably 5 minutes, and most preferably 10 minutes, the reaction mixture is heated to the desired temperature and maintained for a time sufficient for the derivatization reaction to proceed to near completion.

The amount of monofunctional etherifying agent utilized in the invention will vary with the desired degree of substitution of the reaction product. Generally, the desirable degree of substitution is higher than 0.5, more preferably higher than 1.0 and most preferably higher than 1.5. For the preparation of the hydrogel forming material of the present invention, the etherifying agent is added in an amount equal to 5% by weight of the hemicaustic extract solution, more preferably 10% by weight of the hemicaustic extract solution and most preferably the amount ranging from 5% to 50% by weight of the hemicaustic extract solution.

By varying the amounts of the hemicaustic extract solution, etherifying agent, cross-linking agents, and/or the conditions under which the gelling material is formed, gels with a wide range of viscosities, ranging from low to high viscosity, and high gel strength can be produced.

The desired degree of substitution can be achieved by knowing the amount of hemicelluloses present in the hemicaustic extract and adding derivatizing and cross-linking agents at mole ratios that affords a desirable degree of substitution. The teachings of this application can be readily utilized by those skilled in the art cellulose gels to determine the appropriate amounts of reagents and reaction time to achieve the desired properties.

The derivatization reactions of hemicelluloses in hemicaustic solution according to the invention can be performed in various types of mixing equipment, such as in containers provided with agitators or in rotating chambers. Preferably, to obtain the good mixing that leads to an efficient reaction, the hemicaustic extract should have a water content of at least about 10% by weight. Below said percentage the derivatized hemicelluloses are too hard to be pressed between heated rollers for drying and grinding. A water content of about 90% by weight is the upper limit for the desired fragmentation of the product gelling material between heated rollers. Above this percentage the product hydrogel forming material is too diluted and the removal of the moisture by the preferred heated drum rollers becomes less economical. Accordingly, derivatized hemicellulose extract according to the invention, with a water content of about 10% to 90% by weight, and more preferably between 20% and 50% by weigh, is preferably dried and fragmented between heated rollers or by feeding it to a drum dryer, where it is passed in a thin layer and dried at a temperature between about 100° C. and 180° C. Several types of drum dryers may be used in carrying out the method of the invention, such as a single drum dryer with top feed by one or more applicator rolls or a double drum dryer with valley feed (see: Whistler/Paschall: Starch: Chemistry and Industry Vol. II (1967) p. 524-528, which is hereby incorporated by reference). The resultant dry film from the drum dryers is reduced to flakes, preferably having a size of 2-5 mm. Preferably the product gelling material in its commercial form is not produced with or dried to a water content below about 5% by weight or with a water content in excess of about 80% by weight, more preferably it is produced with a water content between about 20% and 50% by weight.

It is preferred in the invention that the reaction between hemicelluloses in the hemicaustic extract and the derivatizing agent is catalyzed with an alkaline catalyst. The alkaline catalyst is already one of the components of the hemicaustic solution. Preferably, the alkali catalyst is an alkali hydroxide, with sodium hydroxide more preferred from a cost perspective. However, potassium or calcium hydroxide are also practical choices. Ammonia may also be used, as well as more complex basic catalysts, such as benzyl trimethyl ammonium hydroxide.

The amount of alkaline catalyst in the hemicaustic solution of the invention after the cold caustic extraction of cellulosic pulp can range from about 1% to 10% by weight. Prior to, or in conjunction with the addition of the derivatizing agent to hemicaustic solution, additional catalyst can be added to increase the efficiency of the derivatization reaction.

Preferably alkali hydroxide is added to increase the concentration of the alkaline catalyst in the derivatization reaction feed to about 10%, more preferably to 20% by weight. The alkaline catalyst can be a mixture of two or more alkaline compounds, and can be added to the reaction mixture in solid form or in solution form, preferably in solution form.

The derivatization reaction can be conducted at atmospheric temperature and pressure, under reflux, or at elevated pressures in a closed reactor. The exact pressure is not critical and while higher pressure may be employed, the reaction is most efficiently conducted at whatever pressure develops during the reaction. Generally such pressures will be on the order of from 0 to 150 psig.

The reaction temperature and the reaction period will depend, in part, on the derivatizing agent, and those skilled in the art are capable of determining a suitable reaction temperature and time using the guidelines provided herein. For example, propylene oxide requires a low reaction temperature due to its low boiling point. Consequently, such reaction can be performed at a temperature slightly above the room temperature. Preferably, in case of propylene oxide or ethylene oxide the reaction is performed in pressure reactor, or in a system that includes a reflux condenser.

The temperature range at which the derivatization reaction is generally conducted is from about 20° C. to about 100° C. Preferably the reaction is carried out at a temperature within the range from about 30° C. to about 100° C., and most preferably from about 50° C. to about 100° C. As an additional example, when sodium chloroacetate is used as an etherification agent, the reaction preferably is carried out at a temperature within the range of from about 50° C. to about 80° C. While higher temperatures can be used, such as up to 125° C., there is generally no advantage achieved. The reaction preferably is carried for a period of time until the level of the total residual derivatizing agent is below 5% by weight of the total weight of reactant. In the present invention, the time required for the reaction to be completed can range from about 0.5 hours to about 24 hours. The reaction is conducted under gentle mixing to keep a uniform temperature throughout the reactor.

The derivatization reaction of the invention may be increased by a gradual warming up of the reaction mixture. The reaction preferably is carried out under an ambient atmospheric pressure of an inert gas such as nitrogen, argon, or helium. However, the reaction also can be conducted under pressure. Preferably, the pressure is less than 150 psig, more preferably less than 100 psig, even more preferably less than 80 psig, and most preferably less than 50 psig.

After the reaction has been completed, the reaction product is preferably removed from the reactor and neutralized with an acid to anywhere from slightly basic to slightly acid. Any acid may be used to neutralize the reaction mixture, including strong acids such as hydrochloric acid and sulfuric acid or weak acids such as acetic acid. In a preferred embodiment either sulfuric or acetic acid is used. The amount of acid used is the amount which is necessary to reach the desired pH. The neutralization preferably is performed using a diluted acid solution, such as 10% by weight, more preferably 15%, and most preferably 25% acid by weight. Preferably the reaction mixture is neutralized to pH ranging from 3.0 to 12.0.

After neutralization, the derivatized hemicelluloses, which are a gelling material capable of forming hydrogels in water, preferably are recovered from the reaction mixture which has a water content in the range of about 10% by weight to about 90% by weight. Any method for recovering the derivatized hemicelluloses hydrogel forming material from the aqueous solution without negatively affecting the physical properties of the hydrogel forming material is acceptable for use in the present invention. Examples of such methods are distilling under reduced pressure, evaporative drying, freezing drying, critical point drying and dehydration using organic solvent. Preferably the reaction mixture is initially left without drying and is further cross-linked with a polyvalent metal to enhance gel strength and viscosity. Suitable polyvalent metal cross-linking agents are those capable of complexing with hydroxyl groups, alkoxy groups, carboxyl groups, and carboxylate groups.

The polyvalent metal cross-linking agents which are useful in the invention include titanium(IV) oxysulfate, titanium (IV) tetrachloride, titanium sulfate, tetrakis(isopropoxy)-titanium, aluminum sulfate, zirconium oxychloride, zirconium orthosulfate, zirconium acetate, zirconium tetrachloride, zirconium carbonate, zirconium ammonium carbonate, titanium dioxide, zirconium acetylacetonate, titanium citrate, titanium malate, titanium tartrate, zirconium lactate, and aluminum acetate, sodium borate, sodium tetraborate, disodium tetraborate, potassium borate, potassium tetraborate, and mixtures thereof. The polyvalent metal cross-linking agents can be used in solid form or in solution form. Preferably these cross-linking agents are added in a solution having a cross-linking agent concentration ranging from 0.1% by weight to 80% by weight, more preferably 5% to 70% by weight, and most preferably from 10% to 60% by weight. Preferably, the polyvalent metal cross-linking agent is added to the neutralized derivatization product in an amount sufficient to yield a composition in which the polyvalent metal complex is from about 0.1% to about 20% by weight of the gelling material on a dry basis. The preferred concentration of polyvalent metal ion in the neutralized gelling product is from about 0.1% to 10.0% by weight, and more preferably about 0.1% to about 2.0% by weight.

We have discovered that by varying the selection and/or amounts of cross-linking agents, and/or the conditions under which they are used, gelling materials can be produced which are capable, upon addition to an aqueous solution or suspension, of yielding gelled compositions extending from free mobile gels to rigid gels exhibiting high gel strength.

The viscosity of the gels produced by dispersing the hydrogel forming material of the present invention in water depends on the following factors: 1) type and amount of derivatizing agent, 2) the concentration of the gelling material, 3) the amount of polyvalent metal cross-linking agent used, and 4) the pH of the aqueous gel. The effect of these factors can be seen clearly in the following Examples. Preferably the gelling material of the present invention has a derivatizing density of not less than 20%, and more preferably not less than 10%. The derivatizing density is defined as shown in the following equation:

Derivatizing Density=(number of derivatizing group attached to sugar repeat unit times molar mass of derivatizing group)/molar mass of derivatized sugar repeat unit.

Molar mass of derivatized repeat unit=162(molar mass of anhydroglucose repeat unit)+no. of derivatizing group $X$ molar mass of derivatizing group.

The anhydroglucose repeat unit was chosen because most of hemicelluloses repeat units have molecular formula that is similar to that of anhydroglucose unit.

Preferably the viscosity of an aqueous solution containing 2% by weight of the hydrogel forming material of the present invention is not less than 2000 cp, at 20 rpm and 20° C.

The hemicaustic extracts used in the following examples were obtained by extracting hardwood pulp with 10% sodium hydroxide by weight at 40° C. for 10 minutes and then washing the extracted pulp with water to produce an extract containing about 6% sodium hydroxide and 6.3% hemicelluloses, in which xylan comprised 95% of the hemicelluloses content by weight.

EXAMPLES

Preparation of Hydroxypropyl Hemicelluloses (HPHC)

Examples 1-3

1.0 Kg of hardwood hemicaustic extract was loaded in a 5 liter stirred reactor at room temperature. The reactor was evacuated and refilled five times with nitrogen and then propylene oxide was added at 10% by weight of the hemicaustic solution and glyceroldiglycidyl ether added at 1% by weight of the hemicaustic solution. The mixture was stirred at room temperature for 10 minutes. Then its temperature was raised to 80° C. in 200 minutes, and maintained at 80° C. for 90 minutes. Afterwards the reaction system was cooled down to room temperature. This process was repeated for three samples. The reaction products were neutralized with diluted sulfuric acid to pHs between 4.0 and 13.5 as reported in Table 1. At the end of the process, the product was placed in a tray and dried in a 80° C. oven and ground. The viscosities as measured by Brookfield viscometer (spindle 6, 20 rpm, 20° C.) of the products of Example 1-3 are reported in Table I.

TABLE I

Effect of pH on the viscosity of an aqueous solution containing 5% by weight of a hydrogel forming material prepared as described above.

| Example No. | pH | Viscosity (cp) |
|---|---|---|
| 1 | 13.5 | 650 |
| 2 | 7.5 | 15,500 |
| 3 | 6.5 | 33,500 |

Examples 4-7

Preparation of Carboxymethylhemicelluloses (CMHC)

A kilogram of the hemicaustic extract solution of Examples 1-3 was subjected to evaporation under pressure until its weight was reduced by about 25%. The residue (0.75 kg) was charged into a 2 L Pyrex reaction kettle. The reaction kettle was outfitted as follows: with a thermocouple inserted through a rubber septum, a Teflon bladed agitator on a glass shaft attached to a mechanical mixer, a gas inlet polyethylene tubing inserted through an adapter fitted with a rubber septum, and a gas outlet adapter connected to a gas trap partially filled with oil. The concentrated hemicaustic extract in the reaction kettle was agitated and purged with nitrogen gas for 10 minutes. To the reaction kettle contents various amount of sodium chloroacetate was added in one portion, as listed in Table 2, followed by 0.0375 kg of glyceroldiglycidyl ether (GDGE) [4% of 0.75 kg]. The produced reaction mixture was agitated from 10 minutes at room temperature, the temperature was then increased to about 80° C. in about 30 minutes and maintained at 80° C. for 90 minutes. Afterwards the reaction system was cooled down to room temperature and neutralized with diluted sulfuric acid to a pH of 12.0. A portion of the product was diluted with water to about 4% by weight of hydrogel forming material and its viscosity was measured with Brookfield viscometer (spindle 6, 20 rpm, 20° C.). Results are shown in Table II.

TABLE II

Viscosity of hydrogel solution as a function of amount of sodium chloroacetate.

| Exp. No. | Sodium chloroacetate (% by weight) | Viscosity (cp) |
|---|---|---|
| 4 | 5.0 | 1,350 |
| 5 | 10.0 | 4,200 |
| 6 | 15.0 | 6,100 |
| 7 | 30.0 | 6550 |

Example 8

Cross-Linking of Carboxymethylhemicelluloses Using Polyvalent Metal

Figure 3:
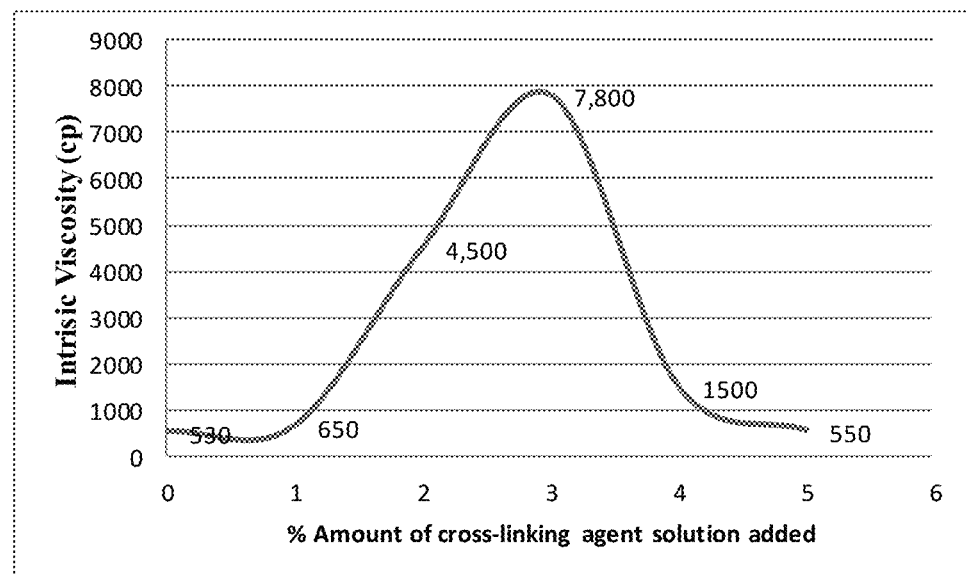
FIG. 3 Viscosity of 2% hydrogel material solution as a function of weight percent of polyvalent metal cross-linking agent (titanium orthosulfate) solution.

A kilogram of the hemicaustic extract of Examples 1-3 was subjected to evaporation under pressure until the weight was reduced by about 25%. The residue (0.75 kg) was charged in a 2 L Pyrex reaction kettle. The reaction kettle was fitted with a thermocouple inserted through a rubber septum, a Teflon bladed agitator on a glass shaft attached to a mechanical mixer, gas inlet polyethylene tubing inserted through an adapter fitted with a rubber septum, and a gas outlet adapter connected to a gas trap partially filled with oil. The concentrated hemicaustic solution in the reaction kettle was agitated and purged with nitrogen gas for at least 10 minutes to remove oxygen. To the reaction kettle and its contents sodium chloroacetate 10% by weight of the hemicaustic was added in one portion. The produced reaction mixture was agitated for 10 minutes at room temperature, the temperature was then increased to about 80° C. in about 30 minutes and maintained at 80° C. for 90 minutes. Afterwards the reaction system was cooled down to room temperature and its contents were neutralized with diluted sulfuric acid to a pH 12.0. A portion of the product was removed from the reaction mixture and diluted with water to 2% by weight of hydrogel material and cross-linked with titanium orthosulfate solution (30% by weight). Viscosity as a function of amount of cross-linking agent titanium orthosulfate solution is shown in FIG. 3. The viscosities were measured with Brookfield viscometer (spindle 6, 20 rpm, 20° C.).

Examples 9-13

Hydrogel from Hemicaustic Solution and Mono and Divalent Etherification Reagents A kilogram of the hemicaustic extract of Examples 1-3 was subjected to evaporation under pressure until the weight was reduced by about 25%. The residue (0.75 kg) was charged in a 2 L Pyrex reaction kettle. The reaction kettle was fitted with a thermocouple inserted through a rubber septum, a Teflon bladed agitator on a glass shaft attached to a mechanical mixer, gas inlet polyethylene tubing inserted through an adapter fitted with a rubber septum, and a gas outlet adapter connected to a gas trap partially filled with oil. The concentrated hemicaustic solution in the reaction kettle was agitated and purged with nitrogen gas for at least 10 minutes to remove oxygen. To the reaction kettle and its contents sodium chloroacetate 10% by weight of hemicaustic solution and 1% of GDGE were added. The produced reaction mixture was agitated for 10 minutes at room temperature, the temperature was then increased to about 80° C. in about 30 minutes and maintained at 80° C. for 90 minutes. Afterwards the reaction system was cooled down to room temperature and its contents were neutralized with diluted sulfuric to a pH 12.0. A sample of the product was diluted with water to a 2% by weight of hydrogel material then cross-linked with titanium orthosulfate (30% by weight) solution. Viscosity as a function of amount of cross-linking agent is shown in Table III.

The viscosities shown in Table III were measured with Brookfield viscometer (spindle 6, 20 rpm, 20° C.).

TABLE III

Viscosity of hydrogels solutions made of 2% hydrogel material as a function of weight percent of polyvalent metal cross-linking agent (titanium orthosulfate) solution

| Exp. No. | Titanium orthosulfate 30% solution (% by weight) | Viscosity of 2% solution (cp) |
| --- | --- | --- |
| 9 | None | 1,500 |
| 10 | 1 | 6,150 |
| 11 | 2 | 7,230 |

TABLE III-continued

Viscosity of hydrogels solutions made of 2% hydrogel material as a function of weight percent of polyvalent metal cross-linking agent (titanium orthosulfate) solution

| Exp. No. | Titanium orthosulfate 30% solution (% by weight) | Viscosity of 2% solution (cp) |
| --- | --- | --- |
| 12 | 3 | 8,300 |
| 13 | 4 | 22,550 |

Examples 14 to 16

Hydrogel from Hemicaustic, Sodium Chloroacetate and Various Amount of Divalent Etherification Reagents, GDGE A kilogram of the hemicaustic extract of Examples 1-3 was subjected to evaporation under pressure until the weight was reduced by about 25%. The residue (0.75 kg) was charged in a 2 L Pyrex reaction kettle. The reaction kettle was fitted with a thermocouple inserted through a rubber septum, a Teflon bladed agitator on a glass shaft attached to a mechanical mixer, gas inlet polyethylene tubing inserted through an adapter fitted with a rubber septum, and a gas outlet adapter connected to a gas trap partially filled with oil. The concentrated hemicaustic solution in the reaction kettle was agitated and purged with nitrogen gas for at least 10 minutes to remove oxygen. To the reaction kettle and its contents sodium chloroacetate 10% by weight of hemicaustic solution and various amount of GDGE were added. The produced reaction mixture was agitated for 10 minutes at room temperature, the temperature was then increased to about 80° C. in about 30 minutes and maintained at 80° C. for 90 minutes. Afterwards the reaction system was cooled down to room temperature and its contents were neutralized with diluted sulfuric acid to a pH 12.0. A sample of the product was diluted with water to a 2% solution by weight of hydrogel material, then its viscosity was measured with Brookfield viscometer (spindle 6, 20 rpm, 20° C.). Results are shown in Table IV.

TABLE IV

Effect of amount of GDGE on the viscosity of hydrogels solutions.

| Exp. No. | GDGE (% by weight) | Viscosity of 2% solution (cp) |
| --- | --- | --- |
| 14 | None | 7500 |
| 15 | 1 | 2,250 |
| 16 | 2 | 6650 |
| 17 | 3 | 10,200 |
| 18 | 4 | 14,500 |

The invention claimed is:

1. A process for making a hydrogel forming material from a kraft or sulfite pulping process cellulosic pulp slurry consisting essentially of:
    extracting hemicellulose heteropolymers from the kraft or sulfite pulping process cellulosic pulp slurry as a hemicaustic extract by treating the cellulosic pulp slurry with a cold caustic solution;
    isolating the hemicaustic extract, wherein the hemicaustic extract comprises 2% by weight to 12% by weight hemicellulose heteropolymers and 2% to 8% by weight of caustic;

concentrating the hemicaustic extract to 5% by weight to 15% by weight hemicellulose heteropolymers and about 3% by weight to about 20% by weight of caustic compounds by nanofiltration;

preparing a heterogeneous reaction mixture comprised of the hemicaustic extract and a derivatizing agent comprised of a monofunctional etherifying agent and/or a polyfunctional organic cross-linking agent; and raising the temperature of the reaction mixture to a temperature from about 50° C. to the boiling point of the reaction mixture for a time period sufficient to react the hemicaustic extract and the derivatizing agent and producing a reaction product comprising a hydrogel forming material.

2. The process of claim 1, wherein the derivatizing agent comprises both a monofunctional etherifying agent and a polyfunctional organic cross-linking agent and the weight ratio of the monofunctional etherifying agent to the polyfunctional organic cross-linking agent is from 1:1 to 99:1.

3. A process for making a hydrogel forming material from a kraft or sulfite pulping process cellulosic pulp slurry consisting essentially of:

extracting hemicellulose heteropolymers from the kraft or sulfite pulping process cellulosic pulp slurry as a hemicaustic extract by treating the cellulosic pulp slurry with a cold caustic solution;

isolating the hemicaustic extract, wherein the hemicaustic extract comprises 2% by weight to 12% by weight hemicellulose heteropolymers and 2% to 8% by weight of caustic;

concentrating the hemicaustic extract to 5% by weight to 15% by weight hemicellulose heteropolymers and about 3% by weight to about 20% by weight of caustic compounds by evaporation;

preparing a heterogeneous reaction mixture comprised of the hemicaustic extract and a derivatizing agent comprised of a monofunctional etherifying agent and/or a polyfunctional organic cross-linking agent;

raising the temperature of the reaction mixture to a temperature from about 50° C. to the boiling point of the reaction mixture for a time period sufficient to react the hemicaustic extract and the derivatizing agent and producing a reaction product comprising a hydrogel forming material; and neutralizing the hydrogel forming material to a pH from 3 to 12 by treatment with an acid, wherein the water content of the neutralized reaction product is from 10% by weight to 90% by weight and the reaction product is dried to a water content from 20% by weight to 50% by weight.

4. A process for making a hydrogel forming material from a kraft or sulfite pulping process cellulosic pulp slurry consisting essentially of:

extracting hemicellulose heteropolymers from the kraft or sulfite pulping process cellulosic pulp slurry as a hemicaustic extract by treating the cellulosic pulp slurry with a cold caustic solution;

isolating the hemicaustic extract;

preparing a heterogeneous reaction mixture comprised of the hemicaustic extract and a derivatizing agent comprised of a monofunctional etherifying agent and a polyfunctional organic cross-linking agent, wherein the monofunctional etherifying agent comprises an alkyl halide, halocarboxylic acid, halofatty acid, haloalkylsulphonic acid, haloalkylammonium compound, halohydin, chloroacetic acid, a chloroacetic acid salt, chloromethane, an alkylene oxide, epoxychlorohdrin or an epoxy carboxylic acid and the polyfunctional organic cross-linking agent comprises ethylene glycol diglycidyl ether, glycerol triglycidyl ether, glycerol diglycidyl ether, glycerol propoxylate triglycidyl ether, polyethylene glycol diglycidyl ether, propylene glycol glycidyl ether, 1,4-cyclohexanoldimethanol diglycidyl ether, 1,2-dichloroacetic acid, a salt of 1,2-dichloroacetic or 1,3-dichloropropanol; and raising the temperature of the reaction mixture to a temperature from about 50° C. to the boiling point of the reaction mixture for a time period sufficient to react the hemicaustic extract and the derivatizing agent and producing a reaction product comprising a hydrogel forming material.

5. The process of claim 4, wherein the weight ratio of the monofunctional etherifying agent to the polyfunctional organic cross-linking agent is from 1:1 to 99:1.

6. The process of claim 5, further comprising the step of adding a polyvalent metal cross-linking agent to the reaction product and reacting it with the hydrogel forming material and wherein the polyvalent metal cross-linking agent comprises titanium(IV) oxysulfate, titanium (IV) tetrachloride, titanium sulfate, tetrakis(isopropoxy)-titanium, aluminum sulfate, zirconium oxychloride, zirconium orthosulfate, zirconium acetate, zirconium tetrachloride, zirconium carbonate, zirconium ammonium carbonate, titanium dioxide, zirconium acetylacetonate, titanium citrate, titanium malate, titanium tartrate, zirconium lactate, and aluminum acetate, sodium borate, sodium tetraborate, disodium tetraborate, potassium borate or potassium tetraborate.

* * * * *